United States Patent
Song et al.

(10) Patent No.: US 7,141,943 B2
(45) Date of Patent: Nov. 28, 2006

(54) BRUSHLESS DC MOTOR SYSTEM AND METHOD OF CONTROLLING THE SAME

(75) Inventors: Joong-Ho Song, Seoul (KR); Ick Choy, Seoul (KR)

(73) Assignee: Korean Institute of Science and Technology, Seoul (KR)

( * ) Notice: Subject to any disclaimer, the term of this patent is extended or adjusted under 35 U.S.C. 154(b) by 0 days.

(21) Appl. No.: 11/026,148

(22) Filed: Dec. 30, 2004

(65) Prior Publication Data

US 2006/0145639 A1    Jul. 6, 2006

(51) Int. Cl.
*H02K 21/00* (2006.01)
*H02K 23/00* (2006.01)
*H02K 31/00* (2006.01)
*H02P 1/18* (2006.01)
*H02P 3/08* (2006.01)

(52) U.S. Cl. ............. 318/254; 318/138; 318/439; 318/599

(58) Field of Classification Search ............ 318/700, 318/715, 713, 718, 800, 801, 811, 799, 803, 318/805, 808, 812
See application file for complete search history.

(56) References Cited

U.S. PATENT DOCUMENTS

| | | | | |
|---|---|---|---|---|
| 5,350,988 | A * | 9/1994 | Le | 318/618 |
| 5,821,708 | A * | 10/1998 | Williams et al. | 318/254 |
| 5,914,582 | A * | 6/1999 | Takamoto et al. | 318/801 |
| 6,013,994 | A * | 1/2000 | Endo et al. | 318/432 |
| 6,388,420 | B1 * | 5/2002 | Jansen et al. | 318/799 |
| 6,400,107 | B1 * | 6/2002 | Nakatani et al. | 318/254 |
| 6,459,230 | B1 * | 10/2002 | Tao | 318/798 |
| 6,462,491 | B1 * | 10/2002 | Iijima et al. | 318/254 |
| 6,700,343 | B1 * | 3/2004 | Masaki et al. | 318/434 |
| 6,777,898 | B1 * | 8/2004 | Peterson | 318/139 |
| 6,856,107 | B1 * | 2/2005 | Daboussi | 318/135 |
| 6,894,450 | B1 * | 5/2005 | Cheng et al. | 318/254 |

FOREIGN PATENT DOCUMENTS

| | | |
|---|---|---|
| JP | 2001-136772 | 11/1999 |
| KR | 1020000050410 A | 1/1999 |

* cited by examiner

*Primary Examiner*—Lincoln Donovan
*Assistant Examiner*—Erick Glass
(74) *Attorney, Agent, or Firm*—Jones Day

(57) ABSTRACT

A brushless DC (BLDC) motor system and a method of controlling the same are provided. The BLDC motor system comprises a BLDC motor including a rotator and a stator, a plurality of switches, a DC current sensor, a position detector and a controller. The stator has a plurality of coils to which currents having different phase are applied. The switches are driven with switching pulses for switching the currents applied to the coils. The position detector detects a position change of the rotator to thereby generate a counter-electromotive force and the DC current sensor senses currents when the currents are applied from the switches to the coils. Based on a magnitude of the counter electromotive force, the controller generates a compensation voltage in order to control the switches during the commutation interval. Further, a duty ratio of the switching pulse is controlled based on the differences between the currents applied to the coils and a reference current.

5 Claims, 9 Drawing Sheets

BRUSHLESS DC MOTOR SYSTEM AND METHOD OF CONTROLLING THE SAME

FIELD OF THE INVENTION

The present invention generally relates to a Brushless DC (BLDC) motor system, and more particularly to a BLDC motor system and a method of controlling the same to reduce a commutation torque ripple, which occurs during a commutation interval.

BACKGROUND OF THE INVENTION

Generally, a brushless DC (BLDC) motor is a type of a DC motor that does not use mechanical contacting units such as a brush and a commutator. The BLDC motor is known to use an electrical rectifier in lieu of the mechanical contacting units. A typical BLDC motor consists of two main portions, namely, a stator and a rotor. The stator is formed of a plurality of coils, which receive poly-phase currents (e.g., three-phase currents). Rotating magnetic fields are formed by the currents applied to the coils. The rotor is formed of at least one permanent magnet surrounded by the stator, wherein the rotor rotates within the stator.

To rotate the BLDC motor continuously, the rotating magnetic fields must be formed continuously in the BLDC motor. More specifically, in order to rotate the rotor, a commutation of currents applied to the coils must be performed at a proper timing. Commutation means that the currents applied to the coils are switched. In other words, the direction of the currents becomes changed. For example, three-phase currents are commutated in sequence in accordance with the angular positioning of the rotor. Therefore, the angular positioning of the rotor must be measured in order to perform a proper commutation. For this purpose, a position sensor, such as a hall sensor or a resolver, is required.

The BLDC motor has certain advantages since there is no need to replace a worn brush with a new one, the noise caused by an Electromagnetic Interference (EMI) is reduced, the heat transfer characteristic is fair, and a higher power can be obtained compared to other motors having the same size.

FIG. 1 is a block diagram showing a conventional BLDC motor system. The conventional BLDC motor system comprises a power supply 10 for supplying AC power, a converter 20 for converting AC power into DC power, an inverter 30 for performing a switching operation and outputting three-phase currents, a current sensor 40 for detecting phases of the currents outputted from the inverter 30, a BLDC motor 50, a stator 51 in the BLDC motor 50, a rotator 52 which is rotated by the switching operation of inverter 30, a position sensor 60 for detecting the position of a rotator 52, a speed sensor 70 for detecting the rotational speed of the rotator 52, a controller 80 for controlling the switching period of the inverter 30 with current values from the current sensor 40 and signals from the position sensor 60, and a speed sensor 70 for performing a commutation at a proper timing.

Generally, a rectifier circuit, which simply converts AC power into DC power, may be used as the converter 20 for driving the BLDC motor 50.

The inverter 30, which includes six switching elements, is a power transducer for converting DC power into three-phase AC power. There are two types of inverters, i.e., a current source inverter and a voltage source inverter. The voltage source inverter is mainly used for driving the BLDC motor 50. That is, the voltage source inverter receives DC power and applies voltages to the BLDC motor 50 in a form of a pulse string.

The controller 80 controls the application of the three-phase currents from the inverter 30 to the stator 51 for rotating the rotator 52. This is accomplished by synchronizing the magnetic poles of the rotator 52 with the magnetic poles of the stator such that the operation of the BLDC motor 50 is controlled. More particularly, the controller 80 controls the operation of the BLDC motor 50 by applying a voltage and a current in the form of pulses, the widths of which are modulated with saw-tooth wave signals inputted from the outside. The controller 80 detects the current applied to the BLDC motor 50, generates a control signal by calculating the signals inputted from the position sensor 60 and the speed sensor 70 based on the value of the detected current, and supplies the control signal to the inverter 30. Such control by the BLDC motor is often called the torque control since the BLDC motor 50 controls the torque, which occurs by the current supplied to the BLDC motor 50.

According to the conventional method adopting the switching operation of the inverter 30, the currents inputted to the BLDC motor are controlled through the use of the three-phase currents outputted from the inverter 30 for reducing a torque ripple. That is, the switching elements of the inverter 30 are used to apply three-phase voltages to the BLDC motor 50. In such a case, the BLDC motor 50 is controlled by a constant duty ratio of pulses for switching. In other words, the current of each phase is applied to the coil whenever the rotator is detected to be at a predetermined position, for example, at an angle of 120° from a reference point. Also, it takes time to increase the current to a desired value or to decrease the current to zero. That is, the increase or decrease of the current is delayed due to a resistor and an inductance of each coil. The current delay, as well as the changes of a rotational angle, generates torque. The torque ripple is generated by the commutation whenever the phase of the current applied to the coil is changed.

The torque ripple causes vibrations and noises in the motor. To reduce the torque ripple in the BLDC motor 50 using a trapezoid wave of counter-electromotive force, it is preferable to use three AC current sensors 40 for controlling the currents outputted from the inverter 30. There is currently a method of reducing the torque ripple using a single DC current sensor for controlling the output currents of the inverter instead of using three current sensors.

FIG. 2 is a graph showing the saturation conditions of currents and voltages in the current controller 80 during the commutation interval of the conventional inverter through the use of a saw-tooth wave as a carrier wave for the Pulse Width Modulation (PWM). A DC link current "$i_d$" is a value of the current outputted from a DC output port (not shown) of the BLDC motor 50 through each coil having a different phase. A reference current "$i_{dref}$" is a current inputted to the controller 80 from the outside. A DC supplying voltage "$V_d$" is a voltage outputted from the converter 20. A commutation interval "$t_c$" is a time when the commutation occurs in the BLDC motor 50. A sampling time "Ts" is duration of time required to control the current. "$V_{mout}$" denotes a voltage obtained by performing a deadbeat current control. The deadbeat current control is performed when an error occurs between the current value $i_d$ of each phase and the reference current value $i_{dref}$. The controller 80 performs the deadbeat current control to improve the current control performance. As shown in FIG. 2, when the deadbeat current control is performed, it is observed that voltage $V_{mout}$ outputted from the controller 80 is saturated during commutation interval $t_c$ of the inverter 30. The current value $|i_d|$ decreases to zero at the moment of initializing the commutation, and then starts to increase from zero. This occurs due to the characteristic of the BLDC motor system. More specifically, such occurrence is due to the current flowing through the inner diodes of switches during the commutation. In this case, the current value $|i_d|$ should have a normal value necessary for operation. Thus, the controller 80 outputs the voltage $V_{mout}$ to perform the deadbeat current control for restoring the value of current $|i_d|$. The zero-point reach time of one current (e.g., a-phase current) does not coincide with a final-point reach time of another current (e.g., b-phase current) in one commutation interval due to the saturation of output voltage $V_{mout}$. As such, the torque ripple occurs in the BLDC motor 50 during the commutation.

According to the conventional methods for reducing the torque ripple using a single DC current sensor, the switching elements of the inverter 30 are switched with a constant duty ratio of pulses during the commutation interval, or the turn-off time of the switching elements of the inverter 30 is delayed. However, the conventional methods are disadvantageous since they are undesirably sensitive to the change of parameters of the BLDC motor. Thus, the stable performance of the BLDC cannot be guaranteed at the low or high speed due to the speed change of the BLDC motor 50.

SUMMARY OF THE INVENTION

Therefore, it is an object of the present invention to address and overcome the above-referenced problems of the prior art. In particular, the object of the present invention is to reduce a torque ripple, which occurs during a commutation interval, by changing a duty ratio of pulses according to a speed change of the BLDC motor.

Further, another object of the present invention is to control the operation of the BLDC motor without an additional sensor or apparatus.

According to one aspect of the present invention, the present invention provides a Brushless DC (BLDC) motor system, comprising: a power supplying means for supplying a DC voltage and a DC current; a BLDC motor including a rotor and a stator having a plurality of coils, wherein a position change of the rotor generates a counter-electromotive force, and currents having different phases are applied to the coils; an inverter for receiving the DC current and providing the currents having the different phases to the coils, wherein the inverter includes a plurality of switching means driven with different switching pulses during a commutation interval to rotate the rotor; a DC current sensing means for sensing the currents when the currents are applied from the switching means to the coils; a position detecting means for detecting a position of the rotor; and a controlling means for receiving a reference current from outside and calculating a magnitude of the counter-electromotive force based on the detected position, generating a compensation voltage based on the counter-electromotive force, and controlling the switching means based on the compensation voltage during the commutation interval, wherein the controlling means controls a duty ratio of the switching pulses based on differences between the currents applied to the coils and the reference current.

According to another aspect of the present invention, there is provided a method of controlling a Brushless DC (BLDC) motor, which includes a rotor, a stator having a plurality of coils, and a plurality of switching means for switching currents from a power supplying unit to the coils. The switching means is driven with different switching pulses. Such method comprises the steps of: detecting a position of the rotor in the BLDC motor, wherein a position change of the rotor generates a counter-electromotive force; detecting the currents when the currents are applied from the switching means to the coils; calculating a magnitude of the counter-electromotive force based on the detected position; generating a compensation voltage based on the magnitude of counter-electromotive force; and controlling the switching means based on the compensation during the commutation interval, wherein the controlling step comprises the step of controlling a duty ratio of the switching pulses applied to the switching means based on differences between the currents applied to the coils and a reference current value.

BRIEF DESCRIPTION OF THE DRAWINGS

The above object and features of the present invention will become more apparent from the following description of the preferred embodiments given in conjunction with the accompanying drawings.

DETAILED DESCRIPTION OF THE INVENTION

With reference to the drawings, the preferred embodiments of the present invention will be described below in detail.

Figure 1:
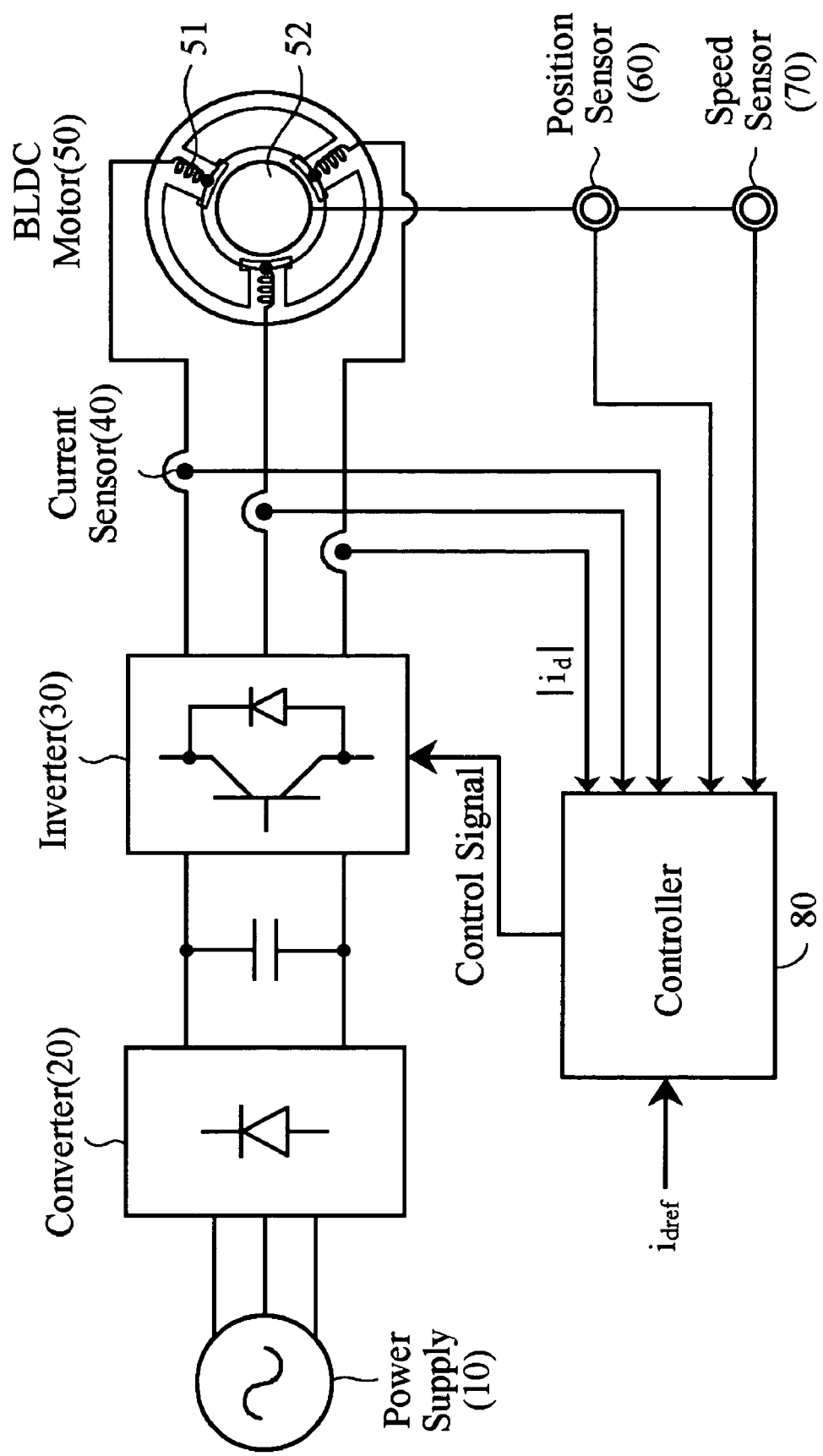
FIG. 1 is a block diagram showing a prior art brushless DC (BLDC) motor system.
Figure 2:
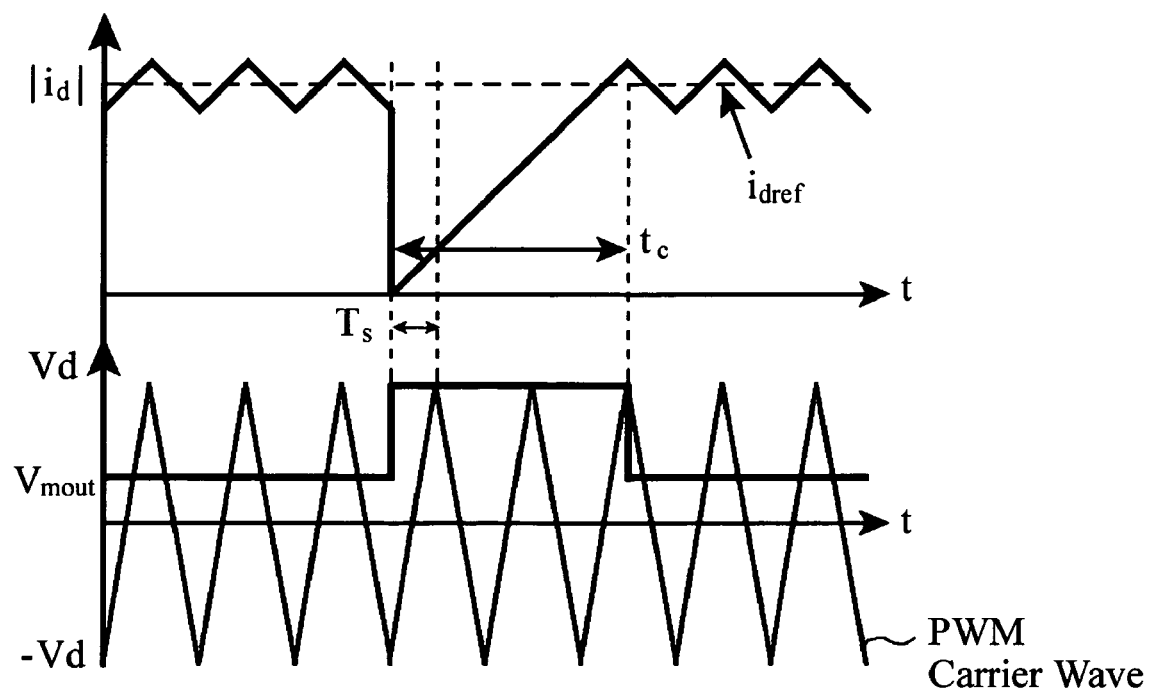
FIG. 2 is a graph showing saturation conditions of currents and voltages in a current controller during the commutation interval of the prior art inverter.
Figure 3:
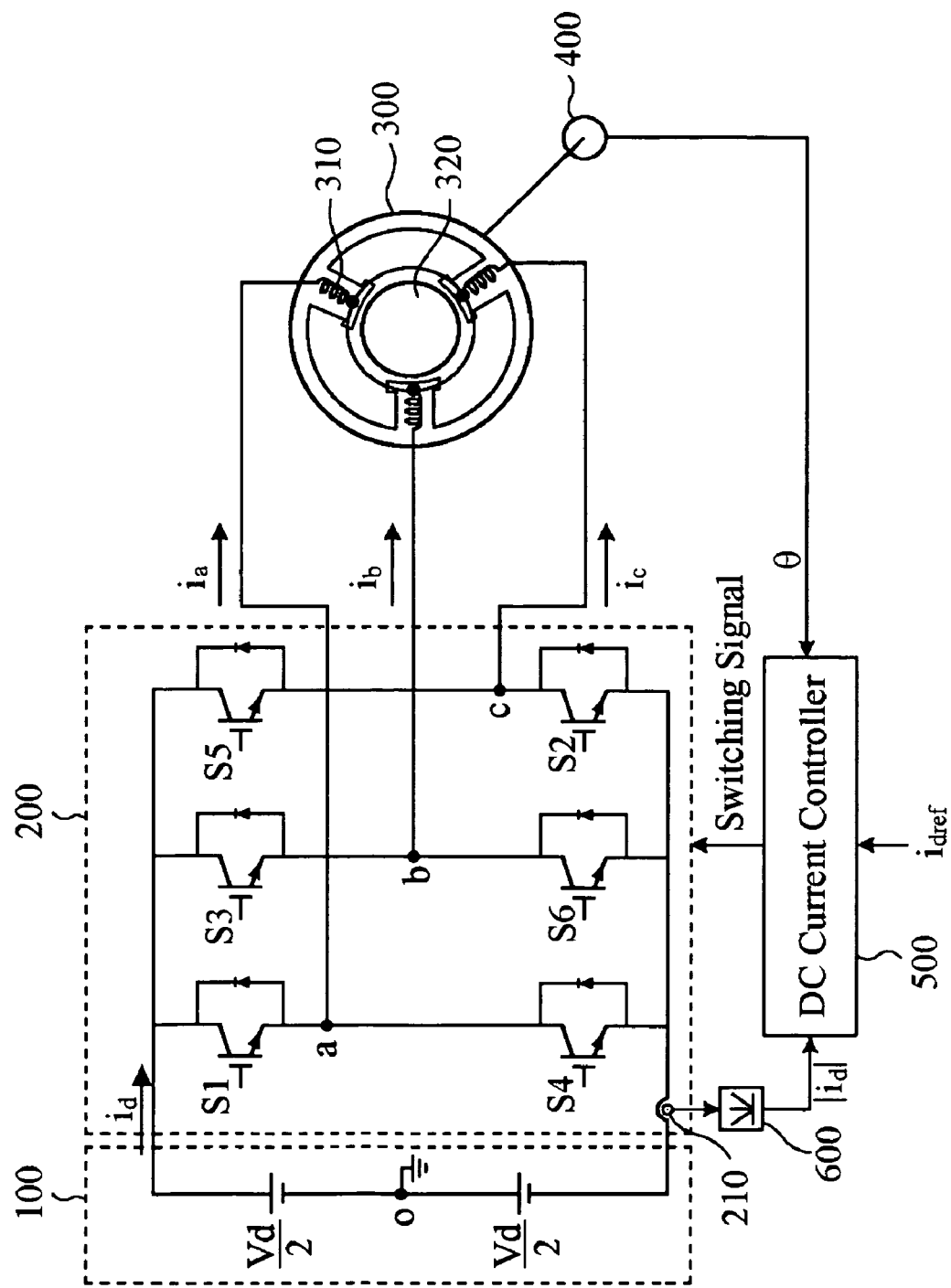
FIG. 3 is a block diagram showing a BLDC motor system for reducing a torque ripple in a BLDC motor constructed in accordance with a preferred embodiment of the present invention.

FIG. 3 is a block diagram showing a BLDC motor system for reducing a commutation torque ripple in a BLDC motor 300 constructed in accordance with a preferred embodiment of the present invention. The BLDC motor system comprises an inverter 200, a position sensor 400, a DC current controller 500 and a rectifier 600.

The BLDC motor system controls the BLDC motor 300, which includes a stator 310 and a rotator 320. The stator 310 has three coils and the rotator 320 has at least one permanent magnet surrounded by the stator 310.

The inverter 200 receives DC power from a power supply 100. It is preferable that the power supply 100 further comprises a converter (not shown) for converting AC power, which is inputted from the outside, into DC power. The inverter 200 comprises six switches S1 to S6. The switches S1 to S6 can be formed with various switching elements. It is preferable to form each switch with a bipolar transistor. The inverter 200 receives DC power necessary for operation from the power supply 100, while the switches S1 to S6 are switched by switching the signals from the DC current controller 500. The inverter 200 further comprises a single DC current sensor 210 for detecting currents ($i_a$, $i_b$ and $i_c$) applied to the coils of the stator 310. The switching order of the switches in the inverter 200 is equal to that of the conventional 3-phase inverters. As such, the switching order will not be explained in detail.

The rotator 320 in the BLDC motor 300 rotates as the currents having three-phases (e.g., a-phase, b-phase and c-phase) are applied to the coils of the stator by the switching operation of the inverter 200.

The position sensor 400 detects a change of the magnetic field due to the rotation of the rotator 320. In other words, the position sensor 400 detects a position of the rotator, generates a position sensing signal θ of the rotator 320, and then transmits the position sensing signal (e.g., phase angle θ) to the DC current controller 500. In the preferred embodiment of the present invention, the position sensor 400 may be formed with a hall sensor.

The DC current controller 500 receives the position sensing signal from the position sensor 400, calculates a counter-electromotive force E generated by a change of phase angle θ of the rotator 320, receives the reference current $i_{dref}$ from the outside and the detection current $|i_d|$ from the DC current sensor 210 via a rectifier 600, generates a Pulse Width Modulation (PWM) carrier wave for driving each switch S1 to S6 of the inverter 200, and transmits the PWM carrier wave to the inverter 200. When saturation voltage $V_{sat}$ is generated during a commutation interval, the DC current controller 500 compensates the saturation voltage $V_{sat}$ appropriately and generates switching signals for reducing the torque ripple, which occurs during the commutation.

Figure 4:
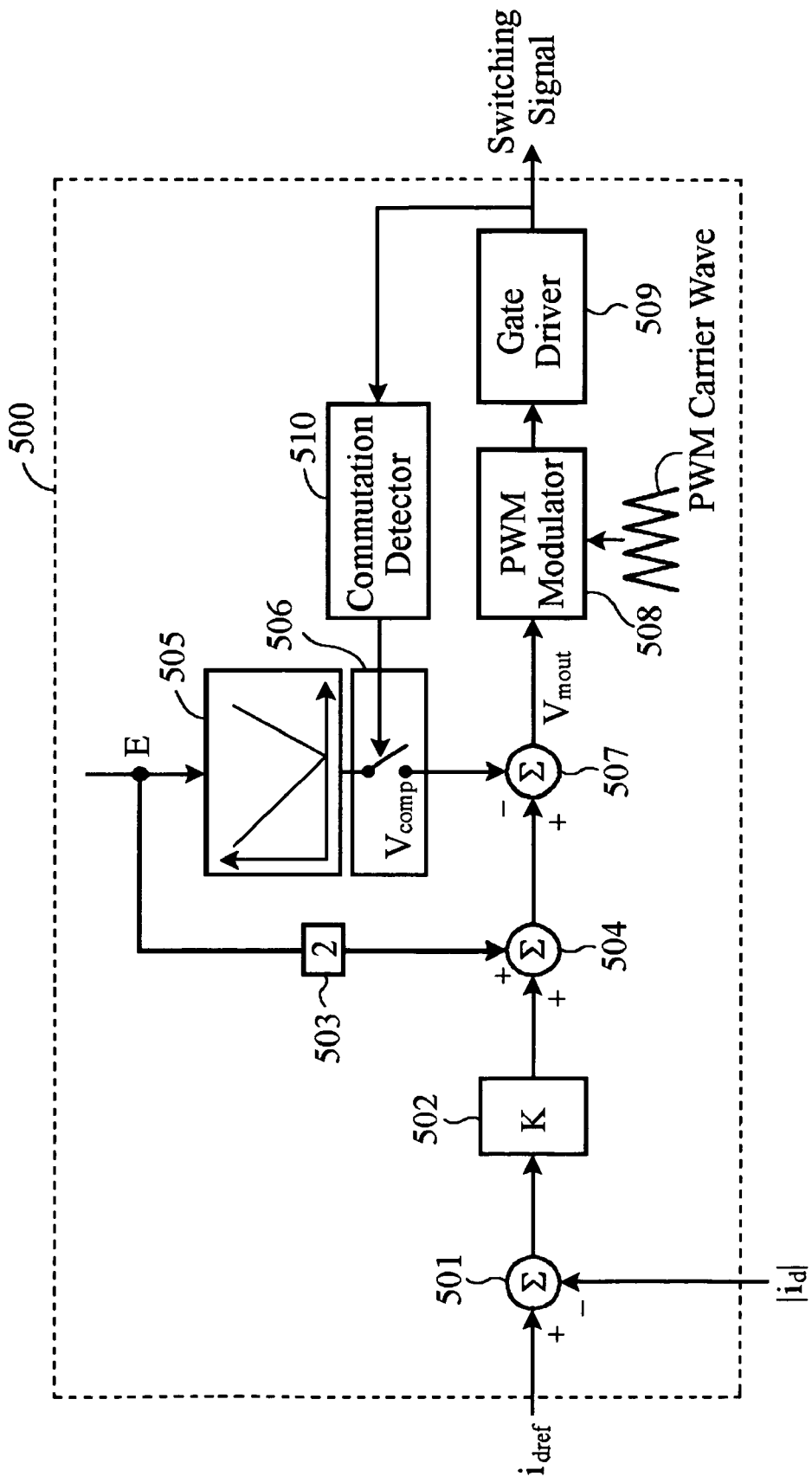
FIG. 4 is a block diagram showing a DC current controller of FIG. 3.

FIG. 4 is a block diagram showing the DC current controller 500 of FIG. 3 in detail. The DC current controller 500 comprises a first adder 501, a first multiplier 502, a second multiplier 503, a second adder 504, a voltage compensator 505, a switching unit 506, a third adder 507, a pulse width modulator 508, a gate driver 509 and a commutation detector 510. The DC current controller 500 compensates the saturation voltage in consideration of the speed change of the BLDC motor 300 in order to reduce the torque ripple during the commutation of the inverter 200.

The first adder 501 receives the reference current $i_{dref}$ from the outside, preferably a microcomputer (not shown), and the detection current $|i_d|$ from the rectifier 600, which rectifies the current detected by the single DC current sensor 210. The first adder 501 calculates an error between the reference current $i_{dref}$ and the detection current $|i_d|$. The first multiplier 502 multiplies a current inputted from the first adder 501 by a first constant K. The second multiplier 503 receives the counter-electromotive force E, which is generated by based on the phase angle change of the rotator 320 from the position sensor 400, and multiplies the counter-electromagnetic force E by a second constant (preferably 2). The second adder 504 receives and adds outputs of the first multiplier 502 and the second multiplier 503. The voltage compensator 505 generates the compensation voltage $V_{comp}$ for reducing the torque ripple on the basis of counter-electromotive force E, which is generated by the phase angle changes of the rotator 320 in the BLDC motor 300.

Figure 5:
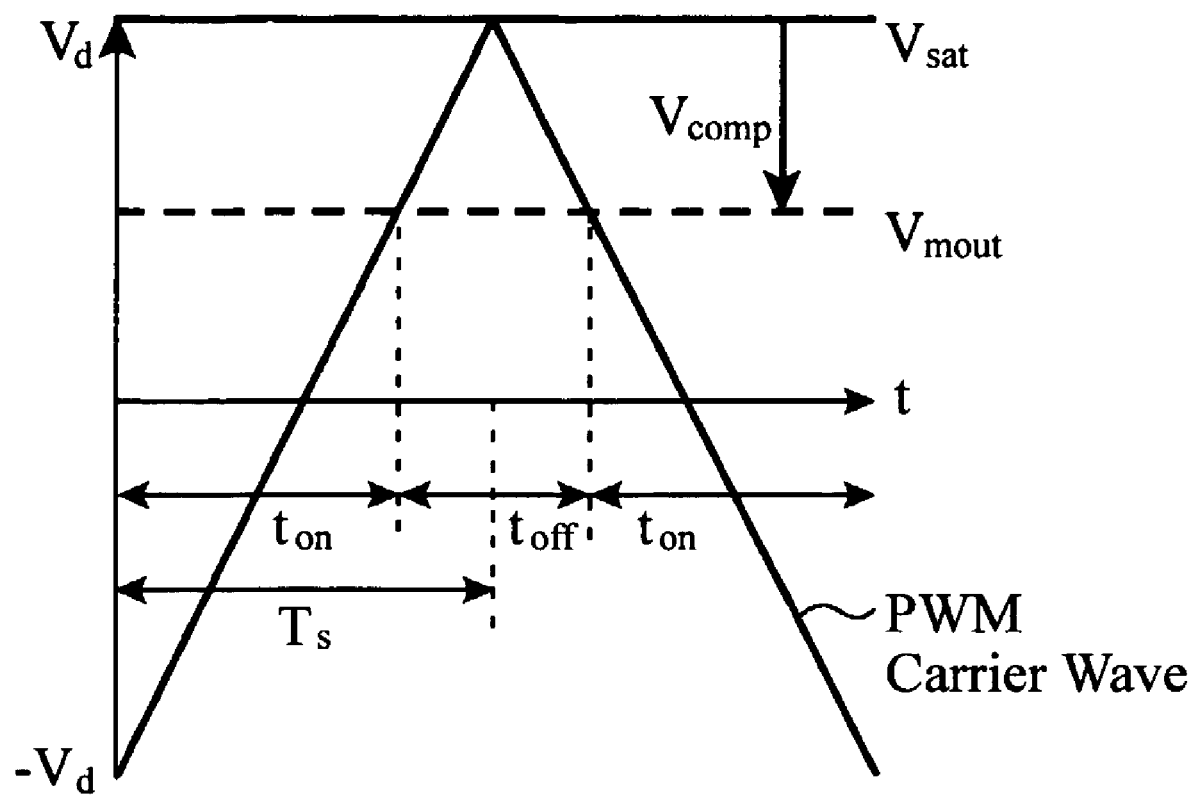
FIG. 5 is a graph showing the relationship between a duty ratio of a switching signal and a compensation voltage in a voltage compensator of FIG. 4.

FIG. 5 is a graph showing the relationship between a duty ratio of the switching signal and a compensation voltage in a voltage compensator of FIG. 4. As shown in FIG. 5, the compensation voltage $V_{comp}$ is applied as the speed of the BLDC motor 300 is changed in order to reduce the torque ripple that occurs during the commutation. Therefore, the DC current controller 500 can control the on/off time, $t_{on}$, $t_{off}$, of switches S1 to S6 by applying the switching signals to the inverter 200. That is, the switches S1 to S6 are turned on and off when the compensated voltage $V_{mout}$ meets with the PWM carrier wave, and hence the switching duty ratio can be changed. As shown in FIG. 5, the PWM carrier wave has a form of saw-tooth. In FIG. 5, "$T_s$" denotes a sample interval time required to control the switching once.

Referring now back to FIG. 4, the switching unit 506 switches the voltage compensated by the voltage compensator 505 according to a switching time of the commutation detector 510. The third adder 507 receives an output of the voltage compensator 505 through the switching unit 506 in accordance with the switching time, and adjusts the output voltage of the second adder 504. The pulse wave modulator 508 performs PWM to the output voltage of the third adder 507 on the basis of the PWM carrier wave. The gate driver 509 receives the modulated switching signal from the pulse wave modulator 508, and generates a gate driving signal for switching each switch S1 to S6 on the basis of the position sensing signal from the position sensor 400. The commutation detector 510 senses the gate driving signal of the gate driver 509, detects a current level during the commutation interval, and drives the switching unit 506 according to the differences between the time when one current (e.g., a-phase current) becomes 0 and the time when another current (e.g., c-phase current) reaches a final current value.

Referring now to FIGS. 3–10, the operation of the BLDC motor system and the method for reducing the commutation torque ripple will be described below in detail.

For example, the operations of the BLDC motor system will be described in case that the states of the switches S1 and S3 in the inverter 200 are transited from the on state into the off state and from the off state into the on state, and the state of switch S2 is maintained at the on-state during the commutation interval. At this time, the phase of the current in the inverter 200 is changed from a-phase to c-phase, and then is changed from b-phase to c-phase by the commutation. At the commutation interval, the current ia of a-phase is decreased and the current $i_b$ of b-phase is increased, while the current $i_c$ of c-phase has the previous current magnitude.

Figure 6:
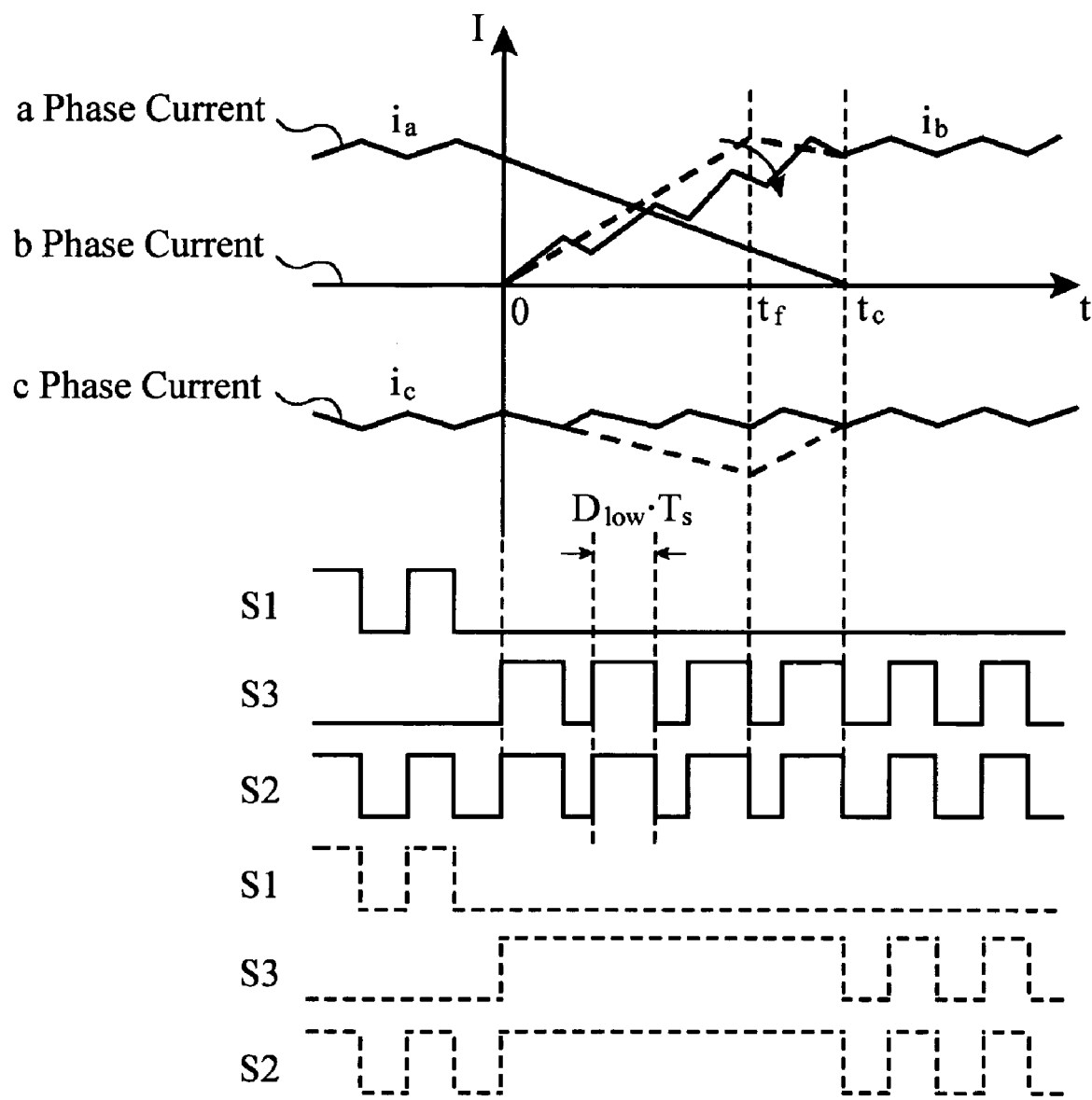
FIG. 6 is a graph showing a Pulse Width Modulation (PWM) pattern in a low-speed region and waveforms of corresponding phase currents to reduce the torque ripple.

FIG. 6 is a graph showing a Pulse Width Modulation (PWM) pattern at a low-speed region and waveforms of corresponding phase currents to reduce the torque ripple. In FIG. 6, the commutation starts t=0, the waveforms in the left side of axis I corresponds to the state before commutation, while those in the right side of axis I corresponds to the state during the commutation. During the commutation interval, the switch S1 of the inverter 200 is turned off and the switch S3 is turned on according to the switching signal from the DC current controller 500. In FIG. 6, the dotted lines represent the current waveform and control pulse applied to the conventional BLDC motor system, while the solid lines represent the current waveforms and switching signal generated by the DC current controller 500 of FIG. 3. In FIG. 6, as shown by dotted lines, if the DC current controller 500 applies the switching signal to each switch S1 to S3 of the inverter 200 during the commutation, the torque ripple occurs in the BLDC motor 300. This is because a zero-point reach time $t_c$ of current ia does not coincide with final-point reach time $t_f$ of current $i_b$.

By coinciding zero-point reach time $t_c$ of current $i_a$ with final-point reach time $t_f$ of current $i_b$ in order to reduce the torque ripple, the commutation of the phase current of BLDC motor 300 can be maintained uniformly, provided that the DC current controller 500 controls the switch S3 and switch S2 with the duty ratio of pulses determined by equation 1:

$$D_{low} = \frac{1}{3}\left(2 + \frac{4E}{V_d}\right) \qquad \text{Eq. (1)}$$

wherein, E is the counter-electromotive force and $V_d$ is a DC supplying voltage. That is, the final-point reach time $t_f$ of current $i_b$ coincides with the zero-point reach time $t_c$ of current $i_a$ by switching the switches S3 and S2 at the duty ratio of pulses determined by equation 1. This is because the final-point reach time $t_f$ of current $i_b$ is shorter than the zero-point reach time $t_c$ of current $i_a$ during the commutation interval. According to equation 1, the pulse width denoting the turn-on time of switches S2 and S3 becomes the duty ratio x the sampling time $D_{low} \times Ts$, as shown in FIG. 6.

Figure 7:
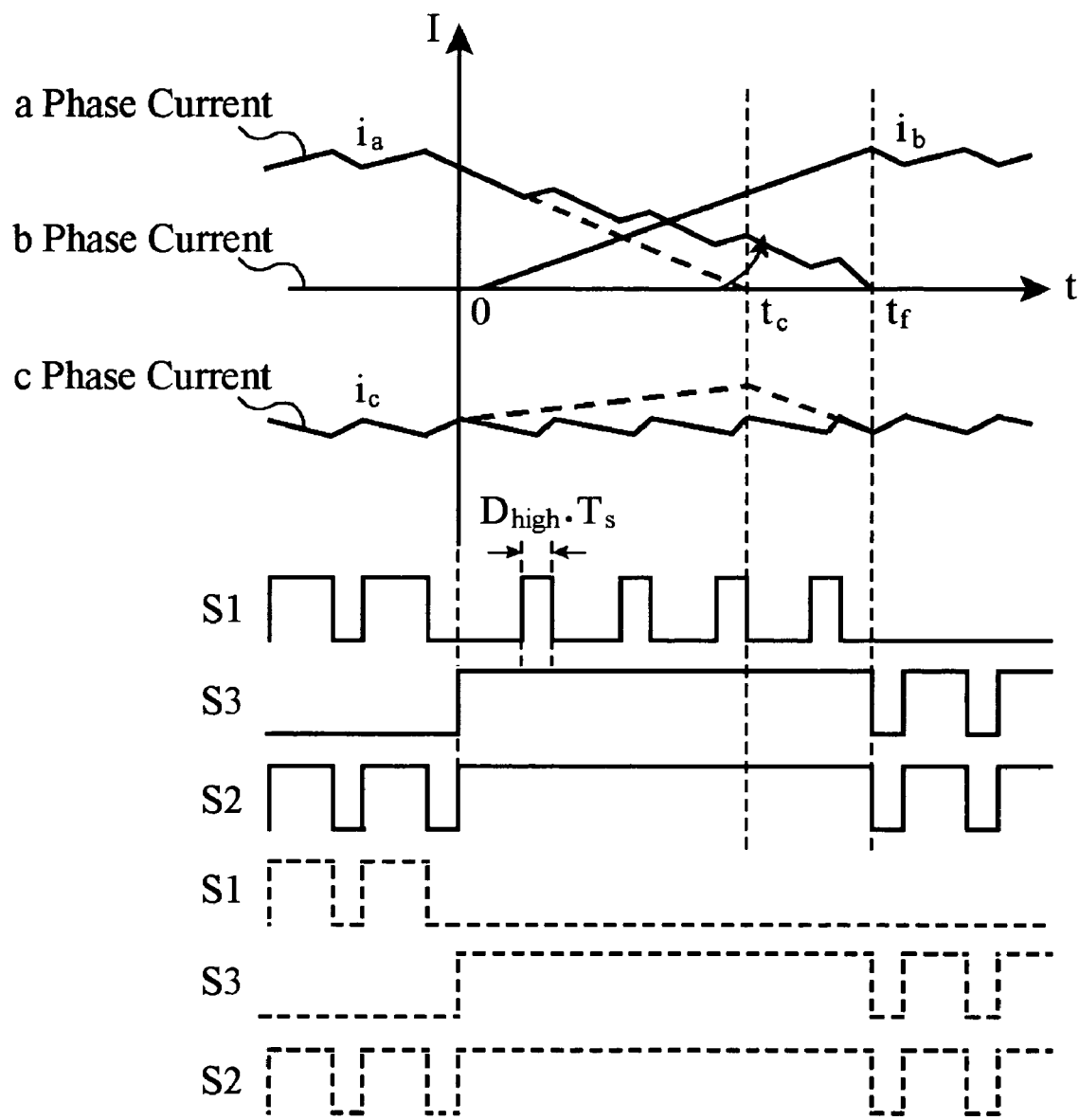
FIG. 7 is a graph showing a Pulse Width Modulation (PWM) pattern in a high-speed region and waveforms of corresponding phase currents to reduce the torque ripple.

FIG. 7 is a graph showing a PWM pattern in a high-speed region and waveforms of corresponding phase currents to reduce the torque ripple. When the BLDC motor 300 rotates at a high speed, the DC current controller 500 controls switch S1 of the inverter 200 with the duty ratio determined by equation 2:

$$D_{high} = \frac{4E}{V_d} - 1 \qquad \text{Eq. (2)}$$

wherein E is the counter-electromotive force and $V_d$ is a DC supplying voltage. The state of switch S2 is converted from the off state into the on state, and the state of switch S3 is maintained at the conduction state. The DC current controller 500 makes the zeropoint reach time $t_c$ of current $i_a$ coincide with the final-point reach time $t_f$ of current $i_b$ by controlling switch S1 of the inverter 200 with the duty ratio determined by equation 2. This is because the zero-point reach time $t_c$ of current ia is shorter than the final-point reach time $t_f$ of current $i_b$. If the duty ratio at the low and high speed regions is calculated by equations 1 and 2, the compensation voltage V, for reducing the torque ripple during the commutation can be calculated by the following equations 3 and 4 based on the calculated duty ratio. The relationship between the compensation voltage and the switching duty ratio in the low-speed region is represented by equations 3 and 4:

$$V_{comp} = 2V_d(1-D_{low}) \qquad \text{Eq. (3)}$$

$$V_{comp} = 2/V_d D_{high} \qquad \text{Eq. (4)}$$

Figure 8:
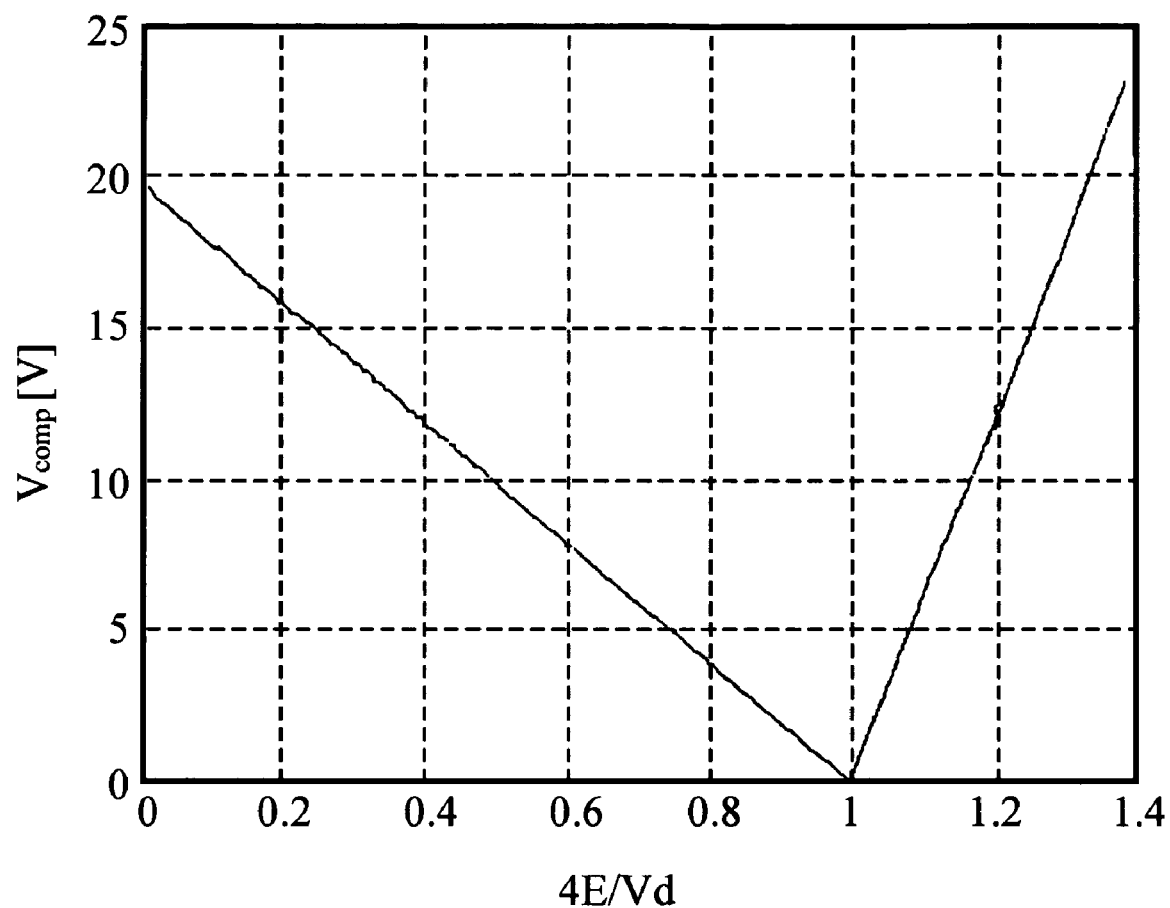
FIG. 8 is a graph showing the relationship between the compensation voltage matched to gradients of the phase currents and variables according to the BLDC motor speed.

FIG. 8 is a graph showing the relationship between the compensation voltage for making the gradients of the phase currents coincide and variables according to the BLDC motor speed. That is, FIG. 8 is a graph showing the relationship between the compensation voltage $V_{comp}$ according to the preferred embodiment of the present invention and variable $4E/V_d$ according to the speed of the BLDC motor 300. If variable $4E/V_d$ according to the speed of the BLDC motor 300 is reduced from 1 to 0, then the voltage compensator 505 must increase the compensation voltage $V_{comp}$ in accordance with equation 3. This is because the switching duty ratio in the low-speed region is reduced by equation 1. That is, if the speed of the BLDC motor 300 is reduced, then the magnitude of counter-electromotive force E is reduced since the angular velocity of the rotator becomes small.

On the contrary, if variable $4E/V_d$ according to the speed of the BLDC motor 300 is increased over 1, then the compensation voltage $V_{comp}$ is increased by equation 4. This is because the switching duty ratio $D_{high}$ in the high-speed region is increased by equation 2. That is, if the speed of the BLDC motor 300 is increased in the high-speed region, then the magnitude of counter-electromotive force E is increased since the angular velocity of the rotator of the BLDC motor 300 becomes large. In such a case, the voltage compensator 505 increases the compensation voltage $V_{comp}$ calculated by equation 4 since the switching duty ratio is increased by equation 2.

Figure 9A:
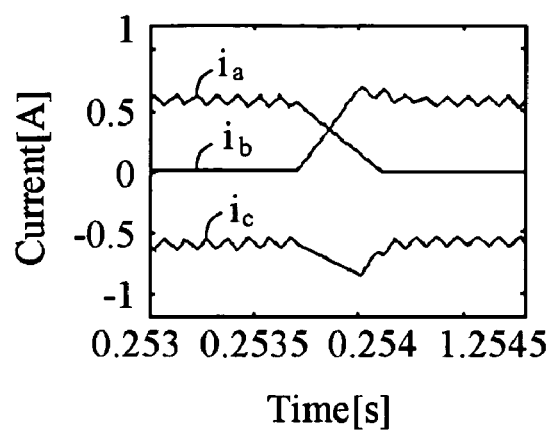
FIG. 9A is a graph showing the values of three phase currents obtained in the conventional BLDC motor system at a low-speed.
Figure 9B:
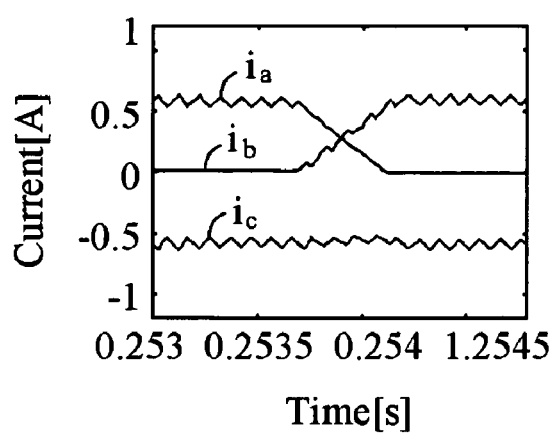
FIG. 9B is a graph showing the values of three phase currents obtained in the BLDC motor system of FIG. 3 at a low-speed.

FIG. 9A is a graph showing the values of three phase currents obtained in the conventional BLDC motor system at a low-speed. FIG. 9B is a graph showing the values of three phase currents obtained in the BLDC motor system of FIG. 3 at a low-speed. In FIG. 9A, the zero-point reach time of current $i_a$ of a-phase does not coincide with the final-point reach time of current $i_b$ of b-phase, while current $i_c$ of c-phase is reduced during the commutation interval, as shown by the dotted lines of FIG. 6. However, if the saturation voltage is compensated with the compensation voltage $V_{comp}$ according to the speed of the BLDC motor 300 to reduce the torque ripple according to the preferred embodiment of the present invention (as shown in FIG. 9B), the zero-point reach time of current $i_a$ of a-phase coincides with the final-point reach time of current $i_b$ of b-phase, while current $i_c$ of c-phase does not decrease and maintains the previous current flowing state.

Figure 10A:
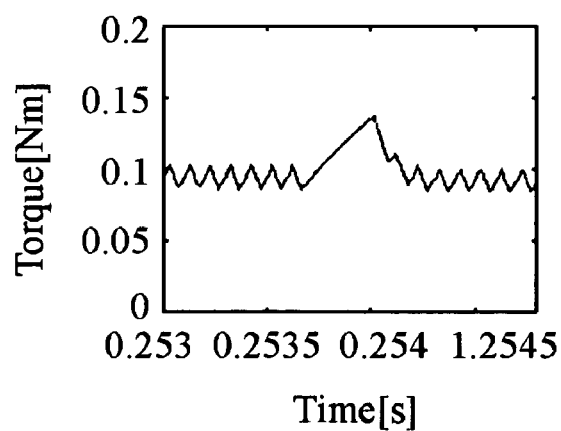
FIG. 10A is a graph showing a measured value of a torque ripple obtained in the conventional BLDC motor system at a low-speed.
Figure 10B:
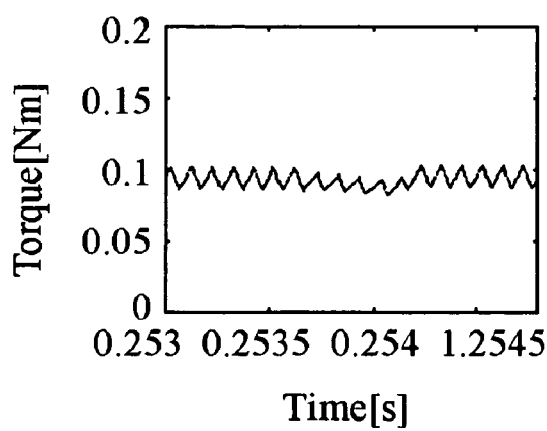
FIG. 10B is a graph showing a measured value of a torque ripple obtained in the BLDC motor system of FIG. 3 at a low-speed.

FIG. 10A is a graph showing a measured value of the torque ripple obtained in the conventional BLDC motor system at a low speed. FIG. 10B is a graph showing a measured value of the torque ripple obtained in the BLDC motor system of FIG. 3 at a low speed. FIG. 10B shows that the torque ripple is entirely reduced according to the present invention. The result shown in FIG. 10B is obtained when the speed of the BLDC motor 300 is low. Further, the same result (not shown) can be obtained when the speed of the BLDC motor 300 is high.

According to the present invention, the torque ripple generated during the commutation interval can be reduced with a single DC current sensor.

The present invention is described with reference to the preferred embodiments and the drawings, but the description is not intended to limit the present invention to the form disclosed herein. It should also be understood that a person of ordinary skill in the art is capable of using a variety of modifications and other embodiments equivalent to the present invention. Therefore, only the appended claims are intended to limit the present invention.

What is claimed is:

1. A Brushless DC (BLDC) motor system comprising:
   a power supplying means for supplying a DC voltage and a DC current;
   a BLDC motor including a rotator and a stator having a plurality of coils, wherein a position change of the rotator generates a counter-electromotive force, and currents having different phases are applied to the coils;
   an inverter for receiving the DC current and providing the currents having the different phases to the coils, wherein the inverter includes a plurality of switching means driven with different switching pulses during a commutation interval to rotate the rotator;

a DC current sensing means for sensing the DC current when the currents having the different phases are applied from the switching means to the coils;

a position detecting means for detecting a position of the rotator; and a controlling means for receiving a reference current from outside and calculating a magnitude of the counter-electromotive force based on the detected position, generating a compensation voltage based on the counter-electromotive force, and controlling the switching means based on the compensation voltage during the commutation interval, wherein the controlling means controls a duty ratio of the switching pulses based on differences between the currents applied to the coils and the reference current, and wherein the controlling means comprises:

a first adder for outputting difference values between the currents applied to the coils and the reference current value;

a first multiplier for multiplying the difference values by a first constant;

a second multiplier for multiplying the magnitude of the counter-electromotive force by a second constant;

a second adder for adding the outputs from the first multiplier and the output from the second multiplier;

a voltage compensator for outputting the compensation voltage based on the magnitude of the counter-electromotive force;

a voltage compensation switching unit for switching the compensation voltage;

a third adder for adding the output from the voltage compensation switching unit to each of the outputs from the second adder;

a pulse width modulator for modulating a width of a carrier wave based on the outputs from the third adder;

a gate driver for generating the switching pulses to the switching means based on the output from the pulse width modulator; and a commutation detector for detecting levels of the currents during the commutation interval and controlling the voltage compensation switching unit based on the switching pulses.

2. The BLDC motor system as claimed in claim 1, wherein, when $4E/V_d$ where E is the counter-electromotive force and $V_d$ is the DC voltage applied to the BLDC motor, is smaller than one, the compensation voltage $V_{comp}$ and a duty ratio $D_{low}$ of the switching pulses are determined by the following equations:

$$V_{comp} = 2V_d(1 - D_{low}) \text{ and } D_{low} = \frac{1}{3}\left(2 + \frac{4E}{V_d}\right).$$

3. The BLDC motor system as claimed in claim 1, wherein, when $4E/V_d$ where E is the counter-electromotive force and $V_d$ is the DC voltage applied to the BLDC motor, is larger than one, the compensation voltage $V_{comp}$ and a duty ratio $D_{high}$ of the switching pulses are determined by the following equations:

$$V_{comp} = 2V_d D_{high} \text{ and } D_{high} = \frac{4E}{V_d} - 1.$$

4. A method of controlling a Brushless DC (BLDC) motor including a rotator, a stator having a plurality of coils, a plurality of switching means for switching currents from a power supplying unit to the coils, wherein the switching means is driven with different switching pulses during a commutation interval to rotate the rotator, said method comprising the steps of:

detecting a position of the rotator in the BLDC motor, wherein a position change of the rotator generates a counter-electromotive force;

detecting the currents when the currents are applied from the switching means to the coils;

calculating a magnitude of the counter-electromotive force based on the detected position;

generating a compensation voltage based on the counter-electromotive force; and controlling the switching means based on the compensation voltage during the commutation interval wherein the controlling step comprises the step of controlling a duty ratio of the switching pulses applied to the switching means based on differences between the currents applied to the coils and a reference current value, and wherein, when $4E/V_d$, where E is the counter-electromotive force and $V_d$ is the DC voltage applied to the BLDC motor, is smaller than one, the compensation voltage $V_{comp}$ and a duty ratio $D_{low}$ of the switching pulses are determined by the following equations:

$$V_{comp} = 2V_d(1 - D_{low}) \text{ and } D_{low} = \frac{1}{3}\left(2 + \frac{4E}{V_d}\right).$$

5. A method of controlling a Brushless DC (BLDC) motor including a rotator a stator having a plurality of coils, a plurality of switching means for switching currents from a power supplying unit to the coils, wherein the switching means is driven with different switching pulses during a commutation interval to rotate the rotator, said method comprising the steps of:

detecting a position of the rotator in the BLDC motor, wherein a position change of the rotator generates a counter-electromotive force;

detecting the currents when the currents are applied from the switching means to the coils;

calculating a magnitude of the counter-electromotive force based on the detected position;

generating a compensation voltage based on the counter-electromotive force; and controlling the switching means based on the compensation voltage during the commutation interval, wherein the controlling step comprises the step of controlling a duty ratio of the switching pulses applied to the switching means based on differences between the currents applied to the coils and a reference current value, and wherein, when $4E/V_d$, where E is the counter-electromotive force and $V_d$ is the DC voltage applied to the BLDC motor, is larger than one, the compensation voltage $V_{comp}$ and a duty ratio $D_{high}$ of the switching pulses are determined by the following equations:

$$V_{comp} = 2V_d D_{high} \text{ and } D_{high} = \frac{4E}{V_d} - 1.$$

* * * * *